United States Patent [19]

Dale et al.

[11] Patent Number: 4,539,811
[45] Date of Patent: Sep. 10, 1985

[54] MULTI-PORT DUMP COMBUSTOR

[75] Inventors: Lawrence A. Dale, Severna Park; Stephen E. Grenleski, Jr.; James L. Keirsey, both of Silver Spring; Charles E. Stevens, Highland, all of Md.

[73] Assignee: The United States of America as represented by the Secretary of the Navy, Washington, D.C.

[21] Appl. No.: 346,986

[22] Filed: Jan. 27, 1982

[51] Int. Cl.³ .............................................. F02K 7/10
[52] U.S. Cl. .................................... 60/270.1; 60/733; 60/737
[58] Field of Search ............ 60/270.1, 733, 737, 60/749, 746, 747

[56] References Cited

U.S. PATENT DOCUMENTS

| | | | |
|---|---|---|---|
| 2,518,000 | 9/1950 | Goddard | 60/270.1 |
| 2,632,994 | 3/1953 | Sargent | 60/270.1 |
| 2,716,329 | 8/1955 | Lunger | 60/270.1 |
| 2,782,593 | 2/1957 | Lee et al. | 60/35.6 |
| 2,859,588 | 11/1958 | Wilson | 60/270.1 |
| 2,937,501 | 5/1960 | Trousse | 60/270.1 |
| 2,941,362 | 6/1960 | Bailey | 60/270.1 |
| 3,030,768 | 4/1962 | Yahnke | 60/35.6 |
| 3,054,259 | 9/1962 | Arthur et al. | 60/39.72 |
| 3,066,480 | 12/1962 | Buck | 60/35.6 |
| 3,618,318 | 11/1971 | Bryce | 60/749 |
| 3,800,527 | 4/1974 | Marshall et al. | 60/749 |
| 3,807,169 | 4/1974 | Bradford | 60/270.1 |
| 4,271,674 | 6/1981 | Marshall et al. | 60/737 |
| 4,271,675 | 6/1981 | Jones et al. | 60/737 |
| 4,356,698 | 11/1982 | Chamberlain | 60/737 |

FOREIGN PATENT DOCUMENTS

| | | | |
|---|---|---|---|
| 0029619 | 10/1980 | European Pat. Off. | 60/737 |
| 696756 | 9/1953 | United Kingdom | 60/35.6 T |

OTHER PUBLICATIONS

E. F. Obert, Internal Combustion Engines, 1968, pp. 115–117.

Primary Examiner—Stephen C. Bentley
Attorney, Agent, or Firm—Paul S. Collignon; Robert F. Beers; Harvey A. David

[57] ABSTRACT

A four-ported dump combustor is designed for use with a ramjet engine and provides high combustion efficiency and pressure recovery for length-to-diameter (L/D) ratios of between 1.3 and 4.4, over a range of operating conditions.

2 Claims, 10 Drawing Figures

MULTI-PORT DUMP COMBUSTOR

BACKGROUND OF THE INVENTION

Heretofore, available dump combustors have good performance over a wide range of conditions for high L/D ratios, that is about 4.5. For very low ratios, however, such as for a ratio of about 1.3, good performance is obtained at unacceptably narrow conditions.

Various types of combustor chambers have been devised, and generally each apparatus has been designed to provide engine performance in one particular area. For example, a combustor assembly might be constructed to provide improved performance at low engine power operation, or for reducing objectionable exhaust emissions. Generally, however, there has not been much effort to provide good engine performance over a wide range of conditions for dump combustors which have low L/D ratios.

SUMMARY OF THE INVENTION

The present invention relates to a multi-port dump combustor which will provide good performance over a wide range of conditions for low L/D ratios.

A four port dump combustor is provided and flameholders are provided in each port to increase combustion efficiency. Different type of flameholders might be used to achieve a particular end result. For example, circular flameholders provide a nearly symmetrical spreading of the fuel-air mixture, radial bar flameholders will increase secondary flows in regions of the combustor dome between ports, and perpendicular bar flameholders will increase secondary flows outboard of the ports as well as in the center of the dome.

Additional features include the use of pilot shrouds for lowering both the lean limits and pressure oscillations and the use of flow dividers for raising the rich operating limits.

It is therefore a general object of the present invention to provide a dump combustor which will have good performance over a wide range of conditions for low L/D ratios.

Other objects, advantages and novel features of the present invention will become apparent from the following detailed description of the invention when considered in conjunction with the accompanying drawings.

DESCRIPTION OF THE PREFERRED EMBODIMENT

Figure 1:
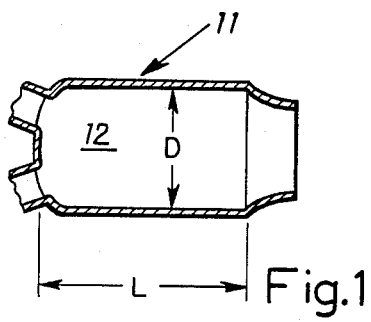
FIG. 1 is a partial sectional view showing a preferred embodiment of the present invention.
Figure 2:
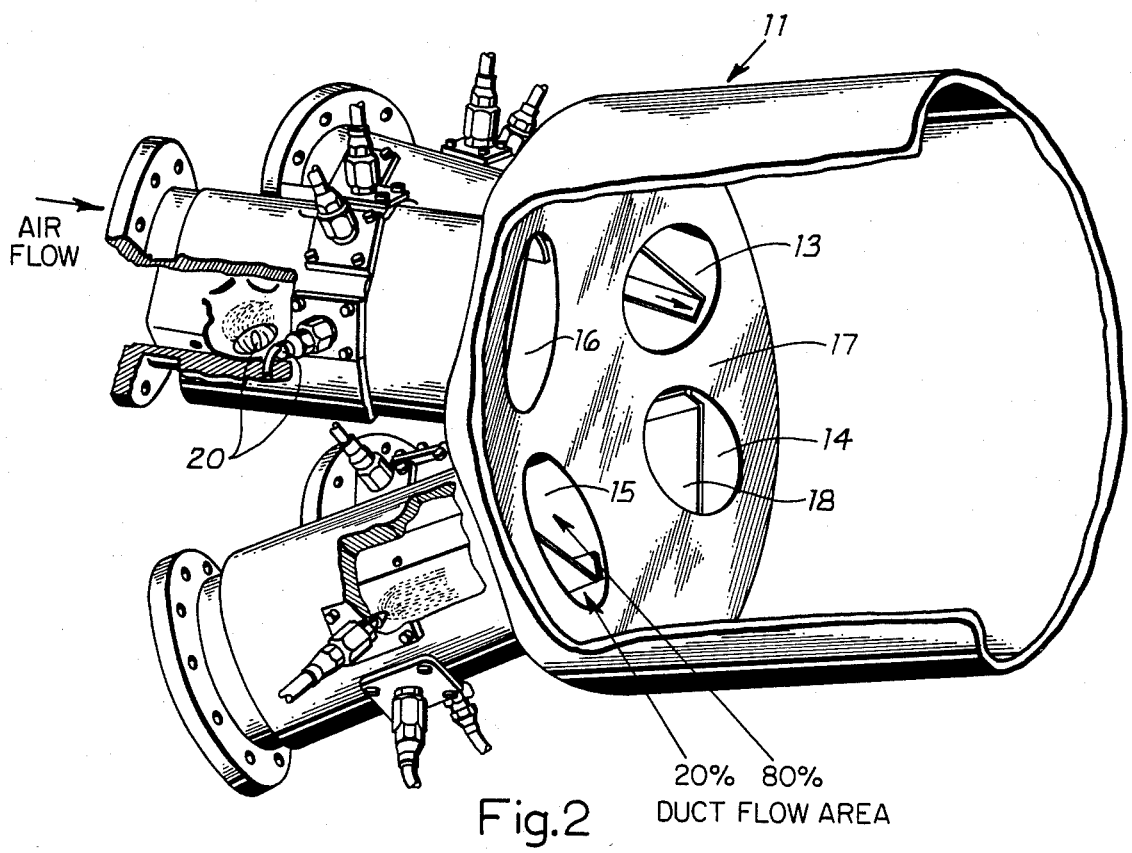
FIG. 2 is a perspective view, partly broken away, of the preferred embodiment.

Referring now to the drawings, FIGS. 1 and 2 show a multi-port dump combustor 11 having a diameter, "D", and a length, "L". The present invention provides good performance over a wide range of conditions for a low L/D ratio, that is, a ratio of about 1.3. By way of example, dump combustor 11, when used as a ramjet engine, might have a diameter of about 13.75 inches and a length of about 17.6 inches. Air-fuel mixture is dumped into the combustor chamber 12 through four ducts 13, 14, 15 and 16 which are provided in a semi-elliptical entrance dome 17. Fuel is injected just upstream of the dump by spring-loaded-pintle nozzles 20 and, by way of example, the fuel might be injected either in an upstream direction, or a downstream direction, or a combination of both. Ducts 13, 14, 15, and 16 are inclined at about 20 degrees to the engine centerline creating a flameholder at the semi-elliptical entrance dome 17. As best shown in FIG. 2 of the drawings, a duct divider 18 can be positioned in each of ducts 13, 14, 15, and 16 to divide each duct so that 80 percent of the flow area is on the inboard side and 20 percent is on the outboard side of the partition. Duct dividers 18 serve to extend the rich operating limit of the engine.

Figure 3:
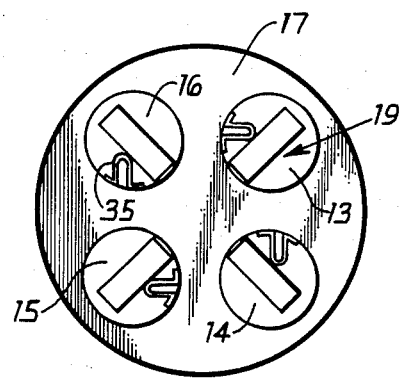
FIG. 3 is an end view, inside the combustor chamber, showing radial bar flameholders and pilot shrouds.
Figure 4:
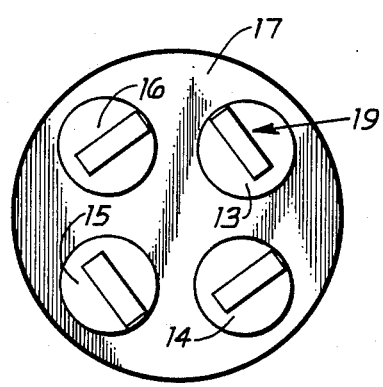
FIG. 4 is a view similar to FIG. 3 showing perpendicular bar flameholders.
Figure 7:
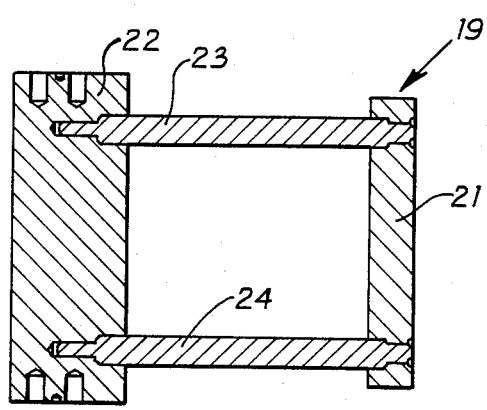
FIG. 7 is a sectional view taken on line 7—7 of FIG. 6.
Figure 6:
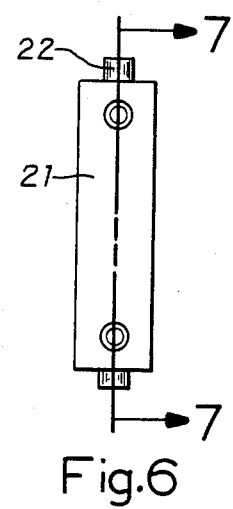
FIG. 6 is an end view of a bar flameholder.

Referring now to FIGS. 6 and 7, there is shown a bar flameholder assembly 19 wherein a bar 21 is attached to an airfoil 22 by means of two standoffs 23 and 24. In FIG. 3 of the drawing, a flameholder assembly 19 is positioned in each duct 13, 14, 15, and 16 in a radial pattern, that is, each bar 21 appears to extend radially from the center of dome 17. In FIG. 4 of the drawing, each bar 21 is positioned so that it is perpendicular to a radial line extending from the center of dome 17. Radial bar flameholders increase combustion efficiency and increase secondary flow in the regions of dome 17 between ports and perpendicular bar flameholders increase combustion efficiency and increase secondary flow outboard of the ports as well as in the center of dome 17.

Figure 5:
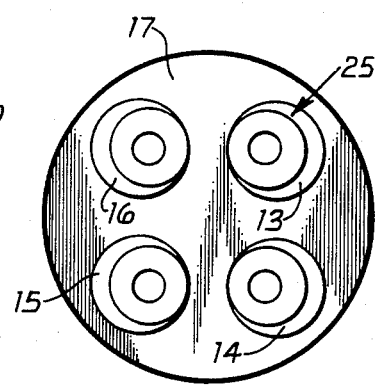
FIG. 5 is a view similar to FIG. 3 showing circular flameholders.
Figure 9:
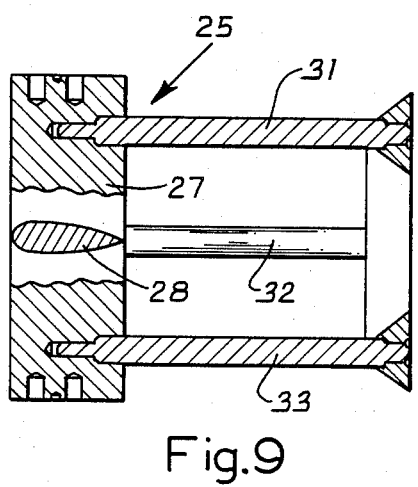
FIG. 9 is a sectional view taken on line 9—9 of FIG. 8.
Figure 8:
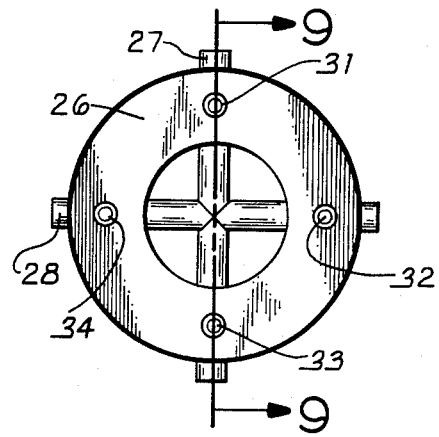
FIG. 8 is an end view of a circular flameholder.

Referring now to FIGS. 8 and 9 of the drawings, there is shown a circular flameholder assembly 25 wherein a circular ring 26 is attached to a pair of airfoils 27 and 28 by four standoffs 31, 32, 33, and 34. As shown in FIG. 5 of the drawings, a circular flameholder assembly 25 can be provided in each duct, and circular flameholders increase combustion efficiency and provide a nearly symmetrical spreading of the fuel-air mixture. The particular flameholder arrangement to be used, that is, either circular flameholders, radial bar flameholders or perpendicular bar flameholders will be determined by the particular performance requirement desired, as each type of flameholder will provide different performance.

Figure 10:
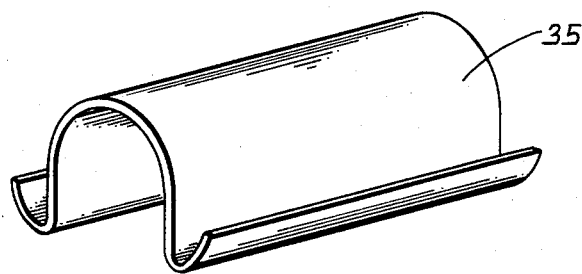
FIG. 10 is a perspective view of a pilot shroud.

Referring now to FIG. 10 of the drawings, there is shown a pilot shroud 35 and FIG. 3 of the drawings show a shroud 35 positioned in each port of the engine. FIG. 3 of the drawings shows a radial flameholder assembly 19 and a shroud 35 in each port, and it should be understood that shroud 35 can be used without the presence of flameholder and likewise the flameholder might be used without having a shroud. Also, shroud 35 might be used with a perpendicular bar flameholder.

It can be thus seen that the present invention provides a four-ported dump combustor which can be provided with parametric changes to change performance of a ramjet engine.

Obviously many modifications and variations of the present invention are possible in the light of the above teachings. It is therefore to be understood that the invention may be practiced otherwise than as specifically described.

We claim:

1. A multi-port dump combustor for a ramjet engine comprising, a cylindrical chamber having a length to diameter ratio of about 1.3, a plurality of ducts opening into one end of said chamber for admitting air-fuel mixture into said chamber, said one end of said chamber being dome-shaped and said plurality of ducts each being inclined at an angle of about 20 degrees to the centerline of said chamber thereby effecting a flameholder function at the dome end, and a duct divider longitudinally positioned in each said duct to divide each said duct into two flow areas so that 80 percent of the flow area of each duct is on the inboard side and 20 percent is on the outboard side of the respective divider.

2. A multi-port dump combustor for a ramjet engine as set forth in claim 1, and wherein said plurality of ducts are four in number.

* * * * *